United States Patent
Phan et al.

(10) Patent No.: US 11,343,792 B2
(45) Date of Patent: May 24, 2022

(54) PAGING IN UNLICENSED SPECTRUM (71) Applicant: TELEFONAKTIEBOLAGET LM ERICSSON (PUBL), Stockholm (SE)

(72) Inventors: Mai-Anh Phan, Herzogenrath (DE); Peter Alriksson, Hörby (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 920 days.

(21) Appl. No.: 16/079,832

(22) PCT Filed: Feb. 24, 2017

(86) PCT No.: PCT/IB2017/051101
§ 371 (c)(1),
(2) Date: Nov. 29, 2018

(87) PCT Pub. No.: WO2017/145120
PCT Pub. Date: Aug. 31, 2017

(65) Prior Publication Data
US 2021/0337502 A1 Oct. 28, 2021

Related U.S. Application Data

(60) Provisional application No. 62/299,786, filed on Feb. 25, 2016.

(51) Int. Cl.
*H04W 68/00* (2009.01)
*H04W 8/00* (2009.01)
(Continued)

(52) U.S. Cl.
CPC ......... *H04W 68/005* (2013.01); *H04W 8/005* (2013.01); *H04W 72/0446* (2013.01); *H04W 74/008* (2013.01); *H04W 74/0816* (2013.01)

(58) Field of Classification Search
CPC ............... H04W 68/005; H04W 8/005; H04W 74/0816; H04W 72/0446; H04W 74/008
See application file for complete search history.

(56) References Cited

U.S. PATENT DOCUMENTS

| 8,260,328 B1* | 9/2012 | Yellin | H04W 52/0206 455/458 |
| 2014/0086173 A1* | 3/2014 | Sadeghi | H04W 72/042 370/329 |

(Continued)

FOREIGN PATENT DOCUMENTS

| JP | 2018-523428 A | 8/2018 |
| WO | 2015167232 A1 | 11/2015 |

(Continued)

*Primary Examiner* — Christine Ng
(74) *Attorney, Agent, or Firm* — Sage Patent Group (57) ABSTRACT

A method and a terminal for acquiring paging information during a set of one or more paging occasions, one paging occasion corresponding to a subframe. In an embodiment, the method determines a first subframe of the set of one or more paging occasions and determines a last subframe of the set of one or more paging occasions. The terminal is required to attempt to acquire the paging information in any subframe between the first subframe and the last subframe of the set of one or more paging occasions.

27 Claims, 6 Drawing Sheets (51) Int. Cl.
*H04W 72/04* (2009.01)
*H04W 74/00* (2009.01)
*H04W 74/08* (2009.01)

(56) References Cited

U.S. PATENT DOCUMENTS

| | | | |
|---|---|---|---|
| 2015/0031382 A1 | 1/2015 | Damnjanovic et al. | |
| 2016/0135141 A1* | 5/2016 | Burbidge | H04W 68/02 |
| | | | 455/458 |
| 2016/0345206 A1* | 11/2016 | Yerramalli | H04L 5/005 |
| 2017/0223737 A1* | 8/2017 | Patel | H04W 24/02 |
| 2017/0230933 A1* | 8/2017 | Radulescu | H04W 68/00 |
| 2017/0280481 A1* | 9/2017 | Stern-Berkowitz | |
| | | | H04W 74/0833 |
| 2017/0303247 A1* | 10/2017 | Yasukawa | H04L 5/0094 |

FOREIGN PATENT DOCUMENTS

| | | |
|---|---|---|
| WO | 2016022748 A | 2/2016 |
| WO | 2016191091 A1 | 12/2016 |
| WO | 2017027798 A | 2/2017 |

\* cited by examiner

PAGING IN UNLICENSED SPECTRUM

RELATED APPLICATIONS

This application is a 371 of International Application No. PCT/162017/051101, filed Feb. 24, 2017, which claims the benefit of U.S. Provisional Application No. 62/299,786, filed Feb. 25, 2016, the disclosures of which are fully incorporated herein by reference.

TECHNICAL FIELD

The subject matter relates to paging terminals in an unlicensed radio spectrum.

BACKGROUND

The Third Generation Partnership Project (3GPP) initiative "License Assisted Access" (LAA) intends to allow 3GPP Long Term Evolution (LTE) equipment to also operate in the unlicensed radio spectrum such as the 5 Gigahertz (GHz) band. The unlicensed spectrum is used as a complement to the licensed spectrum. Accordingly, devices connect in the licensed spectrum to a Primary Cell (PCell) and use carrier aggregation to connect to one or more Secondary Cells (SCells) in the unlicensed spectrum to thereby benefit from additional transmission capacity in the unlicensed spectrum. To reduce the changes required for aggregating licensed and unlicensed spectrum, the LTE frame timing in the PCell is simultaneously used in the SCell.

In addition to LAA operation, it should be possible to run LTE fully on the unlicensed band without the support from the licensed band. MuLTEfire (MF), for example, allows LTE to run solely on the unlicensed band without requiring use of the licensed band.

Regulatory requirements, however, may not permit transmissions in the unlicensed spectrum without prior channel sensing. Because the unlicensed spectrum must be shared with other radios of similar or dissimilar wireless technologies, a so called Listen-Before-Talk (LBT) method needs to be applied before transmitting on a channel in the unlicensed spectrum. Today, for example, the unlicensed 5 GHz spectrum is mainly used by equipment implementing the Institute of Electrical and Electronics Engineers (IEEE) 802.11 Wireless Local Area Network (WLAN) standard. This standard is known under its marketing brand "Wi-Fi." Therefore, in order for LTE equipment to operate in the 5 GHz unlicensed spectrum, the LTE equipment must implement an LBT procedure in order to provide fair access to the unlicensed spectrum.

When operating in the unlicensed spectrum, utilizing a LBT scheme leads to uncertainty at a base station (e.g., an evolved Node B (eNB)) regarding whether it will be able to successfully transmit paging messages to User Equipments (UEs). In LTE, there are specific ways to page UEs, and UEs can be paged for different reasons, e.g. for Discontinuous Reception (DRX) or for notification of system information changes. The eNB of an LTE system can configure Ns={1, 2, 4} Paging Occasions (PO) per Paging Frame (PF). The PO and PF are UE specific and are derived from the UE identity, specifically the International Mobile Subscriber Identity (IMSI) of the UE. The more UEs that are served by a cell, the higher the number of POs per PF will be in order to distribute the UEs and give the eNB a better chance to successfully page different UEs with minimal paging latency.

The UE may use DRX in idle mode in order to reduce power consumption. The configuration of DRX for paging for LTE is described in 3GPP Technical Specification (TS) 36.304, Version 13.2.0, Section 7. Specifically, a UE in idle mode monitors the Physical Downlink Control Channel (PDCCH) during a specific PO for a paging indication referred to as a Paging Radio Network Temporary Identifier (P-RNTI). A PO is a subframe where there may be a P-RNTI transmitted on the PDCCH addressing a paging message. One PF is one radio frame, which may contain one or multiple POs. When DRX is used in LTE, the UE needs only to monitor one PO per DRX cycle.

The PF and PO are determined in LTE by following formulae using the DRX parameters provided in system information (see 3GPP TS 36.331, Version 13.2.0). Specifically, 3GPP TS 36.304, Version 13.1.0, Section 7.1 states:

PF and PO is determined by following formulae using the DRX parameters provided in System Information:

PF is given by following equation:

$$SFN \bmod T = (T \text{ div } N)*(UE\_ID \bmod N)$$

Index i_s pointing to PO from subframe pattern defined in 7.2 will be derived from following calculation:

$$i\_s = \text{floor}(UE\_ID/N) \bmod Ns$$

System Information DRX parameters stored in the UE shall be updated locally in the UE whenever the DRX parameter values are changed in SI. If the UE has no IMSI, for instance when making an emergency call without USIM, the UE shall use as default identity UE_ID=0 in the PF and i_s formulas above.

The following Parameters are used for the calculation of the PF and i_s:

T: DRX cycle of the UE. T is determined by the shortest of the UE specific DRX value, if allocated by upper layers, and a default DRX value broadcast in system information. If UE specific DRX is not configured by upper layers, the default value is applied.

nB: 4T, 2T, T, T/2, T/4, T/8, T/16, T/32.

N: min(T,nB)

Ns: max(1,nB/T)

UE_ID: IMSI mod 1024.

IMSI is given as sequence of digits of type Integer (0 . . . 9), IMSI shall in the formulae above be interpreted as a decimal integer number, where the first digit given in the sequence represents the highest order digit.

The PO for the UE is obtained from a predefined subframe pattern (3GPP TS 36.304, Version, 13.1.0, Section 7.2). The subframe patterns are shown in the tables below, which are reproduced from 3GPP TS 36.304, Version 13.1.0, Section 7.2.

Frequency Division Duplexing (FDD):

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

Time Division Duplex (TDD) (all Uplink/Downlink (UL/DL) configurations):

| Ns | PO when i_s = 0 | PO when i_s = 1 | PO when i_s = 2 | PO when i_s = 3 |
|----|-----|-----|-----|-----|
| 1 | 0 | N/A | N/A | N/A |
| 2 | 0 | 5 | N/A | N/A |
| 4 | 0 | 1 | 5 | 6 |

The paging configuration is provided in System Information Block 2 (SIB2). Specifically, 3GPP TS 36.331, Version 13.1.0, Section 6.3.1 provides:

```
PCCH-Config ::=              SEQUENCE {
defaultPagingCycle           ENUMERATED {
rf32, rf64, rf128, rf256},
nB                           ENUMERATED {
fourT, twoT, oneT, halfT, quarterT, oneEighthT,
oneSixteenthT, oneThirtySecondT}
}
```

It can be seen that in LTE, there is a fixed location where the PO occurs for a UE. As indicated above for unlicensed spectrums, in systems such as MF, transmissions are subject to LBT. If LBT fails, the physical channel is occupied. If the physical channel is occupied, the paging transmission must be postponed to the next paging cycle, which ranges from 320 ms to 2.56 s.

SUMMARY

Systems and methods are disclosed for transmitting and acquiring paging messages in an unlicensed spectrum. In some embodiments, a method in a terminal for acquiring paging information during a set of one or more Paging Occasions (POs), one PO corresponding to a subframe, wherein the method comprises determining a first subframe of the set of one or more POs and determining a last subframe of the set of one or more POs, wherein the terminal is required to attempt to acquire the paging information in any subframe between the first subframe and the last subframe of the set of one or more POs. In some embodiments, the set of one or more POs comprises a set of at least two POs. In this manner, the terminal is able to be efficiently paged, particularly when being paged by a network node operating in an unlicensed spectrum. In other words, rather than simply monitoring a single PO, the terminal monitors a set of POs. In doing so, if the network node is unable to transmit a paging message to the terminal during one of the POs due to, e.g., Listen-Before-Talk (LBT), the network node can transmit the paging message in one of the other POs. In this manner, the terminal can be efficiently paged.

In some embodiments, determining the last subframe of the set of one or more POs comprises detecting a subframe having a Discovery Reference Signal (DRS) transmission, wherein a paging transmission is multiplexed with the DRS transmission in the same subframe.

In some embodiments, determining the last subframe of the set of one or more POs comprises detecting a transmission from a serving cell of the terminal. Further in some embodiments, the detected transmission is a DRS transmission. The DRS transmission may be multiplexed with a paging transmission within a subframe corresponding to the last subframe in the set of one or more POs. Further, in some embodiments, the detected transmission is a transmission addressed to a Paging Radio Network Temporary Identifier (P-RNTI).

Further, in some embodiments, detecting the transmission from the serving cell of the terminal comprises successfully decoding a paging message. Further, the paging message contains a paging identity of the terminal.

In some embodiments, determining the last subframe of the set of one or more POs comprises determining a minimum number of subframes between the first subframe and the last subframe.

In some embodiments, the first subframe of the set of one or more POs is a subframe of a DRS Transmission Window (DTxW). Further in some embodiments, the first subframe is a first subframe of a DTxW.

In some embodiments, the first subframe of the set of one or more POs is subframe zero. In some embodiments, the first subframe of the set of one or more POs is a first subframe of a DTxW and the last subframe of the set of one or more POs is another subframe of the DTxW. In some embodiments, the last subframe is a last subframe of the DTxW. In some embodiments, the last subframe is a subframe outside of the DTxW.

In some embodiments, the set of one or more POs is outside of a DTxW. In some embodiments, the terminal is required to attempt to acquire the paging information in any subframe between the first subframe and the last subframe of the set of one or more POs in a channel that requires LBT.

In some embodiments a terminal for acquiring paging information during a set of one or more POs, one PO corresponding to a subframe, comprises a wireless interface and a processor coupled to the interface, and configured to: determine a first subframe of the set of one or more POs and determine a last subframe of the set of one or more POs, wherein the terminal is required to attempt to acquire the paging information in any subframe between the first subframe and the last subframe of the set of one or more POs.

In some embodiments, determining the last subframe of the set of one or more POs comprises detecting a subframe having a DRS transmission, wherein a paging transmission is multiplexed with the DRS transmission in the same subframe.

In some embodiments, the terminal in determining the last subframe of the set of one or more POs is further configured to detect a transmission from a serving cell of the terminal. Further in some embodiments, the detected transmission is a DRS transmission. The DRS transmission may be multiplexed with a paging transmission within a subframe corresponding to the last subframe in the set of one or more POs. Further, in some embodiments, the detected transmission is a DRS transmission without a paging transmission.

Further, in some embodiments, detecting the transmission from the serving cell of the terminal comprises successfully decoding a paging message. Further, the paging message contains a paging identity of the terminal.

In some embodiments, in determining the last subframe of the set of one or more POs the terminal is configured to determine a minimum number of subframes between the first subframe and the last subframe.

In some embodiments, the first subframe of the set of one or more POs is a subframe of a DTxW. Further in some embodiments, the first subframe is a first subframe of a DTxW.

In some embodiments, the first subframe of the set of one or more POs is subframe zero. In some embodiments, the first subframe of the set of one or more POs is a first subframe of a DTxW and the last subframe of the set of one or more POs is another subframe of the DTxW. In some embodiments, the last subframe is a last subframe of the DTxW. In some embodiments, the last subframe is a subframe outside of the DTxW.

In some embodiments, the set of one or more POs is outside of a DTxW. In some embodiments, the terminal is required to attempt to acquire the paging information in any subframe between the first subframe and the last subframe of the set of one or more POs in a channel that requires LBT.

In some embodiments, a terminal for acquiring paging information during a set of one or more POs, one PO corresponding to a subframe, wherein the terminal is adapted to: determine a first subframe of the set of one or more POs; and determine a last subframe of the set of one or more POs, wherein the terminal is required to attempt to acquire the paging information in any subframe between the first subframe and the last subframe of the set of one or more POs.

In some embodiments, a terminal for acquiring paging information during a set of one or more POs, one PO corresponding to a subframe, wherein the terminal comprises: a first determining module operable to determine a first subframe of the set of one or more POs; and a second determining module operable to determine a last subframe of the set of one or more POs, wherein the terminal is required to attempt to acquire the paging information in any subframe between the first subframe and the last subframe of the PO.

In some embodiments, a terminal for acquiring paging information during a set of one or more POs, one PO corresponding to a subframe, the terminal comprising: means for determining a first subframe of the set of one or more POs and means for determining a last subframe of the set of one or more POs, and wherein the terminal is required to attempt to acquire the paging information in any subframe between said first subframe and said last subframe of the set of one or more POs.

In some embodiments, a non-transitory computer readable medium storing software instructions that when executed by one or more processors of a terminal to cause the terminal to: determine a first subframe of a set of one or more POs and determine a last subframe of the set of one or more POs, wherein the terminal is required to attempt to acquire paging information in any subframe between the first subframe and the last subframe of the set of one or more POs.

In some embodiments, a method in a network node for paging a terminal within a paging occasion window (POW) assigned to the terminal, the POW comprising two or more POs, one PO corresponding to a subframe, wherein the method comprises: transmitting a paging message to the terminal in one of the two or more POs within the POW assigned to the terminal.

In some embodiments, the one of the plurality of POs is a subframe within a DTxW. Further, the paging message is multiplexed with a DRS transmission within the same subframe. Further, the one of the two or more POs is a subframe adjacent to a subframe containing a DRS transmission. Further, the POW is aligned with the DTxW.

In some embodiments, a first subframe of the POW is aligned with a first subframe of a DTxW of the network node and a last subframe of the PO is after a last subframe of the DTxW such that the POW extends beyond the DTxW, and the one of the two or more POs in which the paging message is transmitted is a subframe within the POW but outside of the DTxW.

In some embodiments, the POW is outside of a DTxW in which the network node transmits a DRS. In some embodiments, the one of the two or more POs in which the paging message is transmitted is outside of a DTxW in which the network node transmits a DRS. In some embodiments, the POW is independent of the DTxW. In some embodiments, the two or more POs in the POW comprise two or more consecutive subframes.

In some embodiments, a network node comprises a wireless interface and a processor coupled to the interface, wherein the network node is configured to: transmit a paging message to a terminal in one of the two or more POs within the POW window assigned to the terminal.

In some embodiments, a network node is adapted to: transmit a paging message to a terminal in one of the two or more POs within the POW assigned to the terminal.

In some embodiments, a network node comprises: a transmitting module operable to transmit a paging message to the terminal in one of a plurality of POs within a POW assigned to the terminal.

In some embodiments, a non-transitory computer readable medium storing software instructions that when executed by one or more processors of a network node to cause the network node to transmit a paging message to the terminal in one of a plurality of POs within a POW assigned to the terminal.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Like numbers refer to like elements throughout the description. Throughout the description, User Equipment (UE), wireless device, and terminal are used interchangeably.

The embodiments described below may be implemented in any appropriate type of communication system supporting any suitable communication standards and using any suitable components. As an example, certain embodiments may be implemented in a Long Term Evolution (LTE) network, such as that illustrated in FIG. 1

Figure 1:
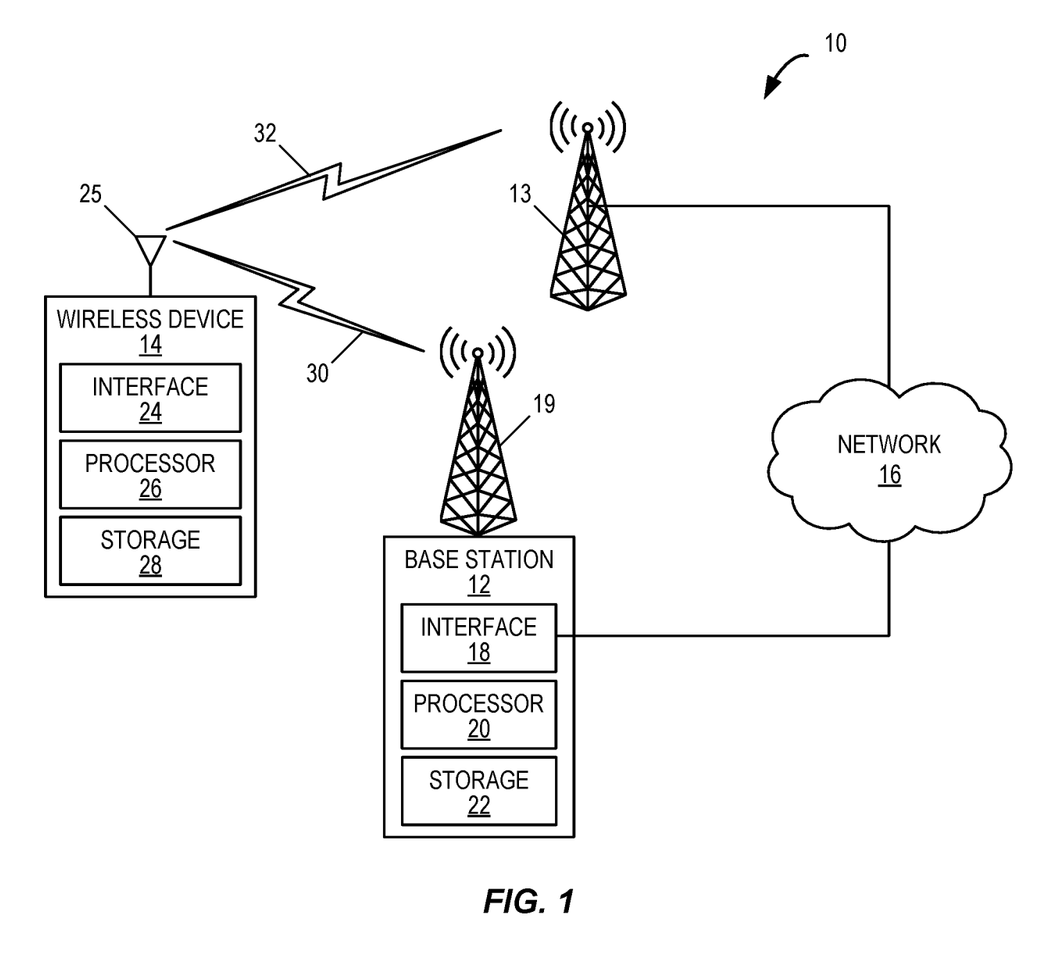
FIG. 1 illustrates an exemplary Long Term Evolution (LTE) network.

FIG. 1 illustrates a wireless network 10 comprising network nodes 12 and 13, and a Wireless Device (WD) 14, in accordance with a particular embodiment. For simplicity, FIG. 1 only depicts the network 16, network nodes 12 and 13, and the WD 14. Note that, as will be appreciated by one of skill in the art, the functions of the network node 12, these functions may be referred to as being performed by the network 16. The network node 12 may also be referred to herein as a radio access node 12, base station 12, or Evolved Node B (eNB) 12. Similarly, the WD 14 may also be referred to herein as a UE 14. The network node 12 comprises an interface 18, an antenna 19, a processor 20, and storage 22. Similarly, the WD 14 comprises an interface 24, an antenna 25, a processor 26, and storage 28. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 16 may comprise one or more Internet Protocol (IP) networks, Public Switched Telephone Networks (PSTNs), packet data networks, optical networks, Wide Area Networks (WANs), Local Area Networks (LANs), Wireless Local Area Networks (WLANs), wired networks, wireless networks, metropolitan area networks, and other networks to enable communication between devices.

The network node 12 comprises the interface 18, antenna 19, processor 20, and storage 22. These components are depicted as single boxes located within a single larger box. In practice however, a network node may comprise multiple different physical components that make up a single illustrated component (e.g., the interface 18 may comprise terminals for coupling wires for a wired connection and a radio transceiver for a wireless connection). As another example, the network node 12 may be a virtual network node in which multiple different physically separate components interact to provide the functionality of the network node 12 (e.g., the processor 20 may comprise three separate processors located in three separate enclosures, where each processor is responsible for a different function for a particular instance of the network node 12). Similarly, the network node 12 may be composed of multiple physically separate components (e.g., a NodeB component and a Radio Network Controller (RNC) component, a Base Transceiver Station (BTS) component and a Base Station Controller (BSC) component, etc.), which may each have their own respective processor, storage, and interface components. In certain scenarios in which the network node 12 comprises multiple separate components (e.g., BTS and BSC components), one or more of the separate components may be shared among several network nodes. For example, a single RNC may control multiple NodeBs. In such a scenario, each unique NodeB and BSC pair may be a separate network node. In some embodiments, the network node 12 may be configured to support multiple Radio Access Technologies (RATs). In such embodiments, some components may be duplicated (e.g., separate storage for the different RATs) and some components may be reused (e.g., the antenna 19 may be shared by the RATs).

The processor 20 may be a combination of one or more of a microprocessor, controller, microcontroller, Central Processing Unit (CPU), digital signal processor, Application Specific Integrated Circuit (ASIC), Field Programmable Gate Array (FPGA), or any other suitable computing device, resource, or combination of hardware, software and/or encoded logic operable to provide, either alone or in conjunction with other network node components, such as the storage 22, network node functionality. For example, the processor 20 may execute instructions stored in the storage 22. Such functionality may include providing various wireless features discussed herein to a wireless device, such as the WD 14, including any of the features or benefits disclosed herein.

The storage 22 may comprise any form of volatile or non-volatile computer readable memory including, without limitation, persistent storage, solid state memory, remotely mounted memory, magnetic media, optical media, Random Access Memory (RAM), Read-Only Memory (ROM), removable media, or any other suitable local or remote memory component. The storage 22 may store any suitable instructions, data or information, including software and encoded logic, utilized by the network node 12. The storage 22 may be used to store any calculations made by the processor 20 and/or any data received via the interface 24.

The network node 12 also comprises the interface 18 which may be used in the wired or wireless communication of signaling and/or data between the network node 12, the network 16, and/or the WD 14. For example, the interface 18 may perform any formatting, coding, or translating that may be needed to allow the network node 12 to send and receive data from the network 16 over a wired connection. The interface 18 may also include a radio transmitter and/or receiver that may be coupled to or a part of the antenna 19. The radio may receive digital data that is to be sent out to other network nodes or WDs via a wireless connection. The radio may convert the digital data into a radio signal having the appropriate channel and bandwidth parameters. The radio signal may then be transmitted via the antenna 19 to the appropriate recipient (e.g., the WD 14).

The antenna 19 may be any type of antenna capable of transmitting and receiving data and/or signals wirelessly. In some embodiments, the antenna 19 may comprise one or more omni-directional, sector or panel antennas operable to transmit/receive radio signals between, for example, 2 Gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The WD 14 may be any type of wireless endpoint, mobile station, mobile phone, wireless local loop phone, smartphone, user equipment, desktop computer, Personal Digital Assistant (PDA), cell phone, tablet, laptop, Voice-Over Internet Protocol (VoIP) phone or handset, which is able to wirelessly send and receive data and/or signals to and from a network node, such as the network node 12 and/or other WDs. The WD 14 comprises the interface 24, antenna 25, processor 26, and storage 28. Like the network node 12, the components of the WD 14 are depicted as single boxes located within a single larger box, however in practice a wireless device may comprises multiple different physical components that make up a single illustrated component (e.g., the storage 28 may comprise multiple discrete microchips, each microchip representing a portion of the total storage capacity).

The processor 26 may be a combination of one or more of a microprocessor, controller, microcontroller, CPU, digital signal processor, ASIC, FPGA, or any other suitable computing device, resource, or combination of hardware, software and/or encoded logic operable to provide, either alone or in combination with other components of the WD 14, such as storage 28, WD functionality. Such functionality may include providing various wireless features discussed herein, including any of the features or benefits disclosed herein.

The storage 28 may be any form of volatile or non-volatile memory including, without limitation, persistent storage, solid state memory, remotely mounted memory, magnetic media, optical media, RAM, ROM, removable media, or any other suitable local or remote memory component. The storage 28 may store any suitable data, instructions, or information, including software and encoded logic, utilized by the WD 14. The storage 28 may be used to store any calculations made by the processor 26 and/or any data received via the interface 24.

The interface 24 may be used in the wireless communication of signaling and/or data between the WD 14 and the network node 12. For example, the interface 24 may perform any formatting, coding, or translating that may be needed to allow the WD 14 to send and receive data from the network node 12 over a wireless connection. The interface 24 may also include a radio transmitter and/or receiver that may be coupled to or a part of the antenna 25. The radio may receive digital data that is to be sent out to the network node 12 via a wireless connection. The radio may convert the digital data into a radio signal having the appropriate channel and bandwidth parameters. The radio signal may then be transmitted via the antenna 25 to the network node 12.

The antenna 25 may be any type of antenna capable of transmitting and receiving data and/or signals wirelessly. In some embodiments, the antenna 25 may comprise one or more omni-directional, sector or panel antennas operable to transmit/receive radio signals between 2 GHz and 66 GHz. For simplicity, the antenna 25 may be considered a part of the interface 24 to the extent that a wireless signal is being used.

Discovery Reference Signals (DRS) are transmitted periodically to allow for initial cell detection and channel quality measurements for idle/connected mode mobility. This allows the UE 14 to measure its serving cell and/or detect/measure other cells. A DRS Transmission Window (DTxW) defines a periodic window during which the eNB 12 attempts DRS transmission, subject to Listen-Before-Talk (LBT) when operating in the unlicensed spectrum. The eNB 12 can select the length of the DTxW, which can be any integer value between 1-10 ms. The length can e.g. be configured depending on the cell load, which will impact the LBT success rate. The minimum DTxW periodicity in LTE is 40 ms. Other periodicities may be configured in MuLTE-fire (MF).

When the DRS is transmitted on subframe (SF) #0-4, the corresponding Cell Specific Reference Signal (CRS) uses scrambling corresponding to SF #0. When DRS is transmitted on SF #5-9, the corresponding CRS uses scrambling corresponding to SF #5. Unicast Physical Downlink Shared Channel (PDSCH) can only be multiplexed with DRS if the DRS is transmitted in SF #0 or SF #5, respectively.

In idle mode, the UE 14 measures the DRS periodically to check the cell reselection criteria. It is assumed that the periodicity for reading DRS of the serving cell is equal to the DRX cycle. In LTE, the UE 14 is required to monitor the serving cell at least once per DRX cycle.

Due to the sparseness of the DRS transmissions (minimum periodicity of 40 ms), the current LTE paging configuration does not guarantee that the Paging Occasion (PO) and DRS transmission are aligned or are at least close in time.

In certain embodiments disclosed herein, a set/number of POs, also referred to as Paging Occasion Window (POW), is used for one paging cycle. Thus, the paging transmission within a paging cycle may not only occur in only one specific PO, i.e. only in one specific paging subframe, but is extended to a configurable set/number of POW occasions consisting of multiple—potentially subsequent—subframes, such that there are multiple POs per paging cycle. Similar to the DTxW, the MF POW could span a length of 1-10 ms.

Some embodiments may include:
1) The MF POW will be configured such that it will cover the serving cell's DTxW to ensure that:
   a) the paging transmission is multiplexed with the DRS transmission in the same subframe. The MF POW has identical length and start subframe as the DTxW; or
   b) the POW is close in time with the DRS transmission.
2) Several MF POW configurations are used, which are independent of the DRS transmission.

Embodiments disclosed herein may reduce the paging latency, while optimizing the UE's power consumption.

In embodiment 1a, the paging and DRS transmission may be performed in the same subframe. This allows for minimized UE power consumption. However, if the number of idle mode UEs that are served by a cell increases above a given threshold, the probability to be able to page all UEs served by a cell within a given time constraint will decrease.

In embodiment 1b, the paging and DRS transmissions are both performed in overlapping windows, but not necessarily in the same subframe. This allows the UE 14 to limit the time in which it is awake and at the same time allow more UEs to be paged compared to the previous embodiment. The UE power consumption is however slightly higher than the previous embodiment where the UE can stop monitoring paging once the DRS is detected.

In embodiment 2, the paging transmission will not necessarily coincide with the DRS transmission. Different MF POW configurations cater for a higher number of UEs to be paged within a given time constraint. The POW will not only be spread within the Paging Frame (PF), but will also be spread between the DTxWs. This embodiment requires the UEs to wake up to attempt for DRS reception and wake up to attempt for paging reception, but will reduce the paging latency for a large number of UEs.

Some of the embodiments described above will now be described more fully hereinafter with reference to the accompanying drawings. Other embodiments, however, are contained within the scope of this disclosure and the disclosure should not be construed as limited to only the embodiments set forth herein; rather, these embodiments are provided by way of example to convey the scope of the inventive concept to those skilled in the art.

Certain embodiments define a POW consisting of several subframes rather than a PO that consists of a single subframe. One advantage of this is that it may be better suited to cater for LBT failures. In some embodiments, the eNB 12 aligns the paging transmission with the DRS transmission, so that they are transmitted in the same subframe. The UE 14 may attempt to receive DRS and paging in parallel, simultaneously, or nearly simultaneously. If the UE 14 detects DRS in a subframe, but no paging, then it will go to sleep in the next subframe, even though the POW covers more subframes. Going to sleep instead of monitoring more subframes may help to improve energy consumption.

In particular embodiments, the eNB 12 may transmit the paging within the POW which is aligned with the DTxW. In such embodiments, the UE 14 may monitor the full POW even if it detects the DRS and/or a paging transmission.

In some embodiments, the eNB 12 may configure the POW independent of the DTxW configuration. There will be POWs which will overlap with the DTxW, while others will not overlap with the DTxW. If the paging is multiplexed with the DRS within the DTxW, the eNB may scramble the CRS corresponding to, for example, SF #0, or SF #5, respectively. Analogously, the UE 14 may consider scrambling corresponding to SF #0 or SF #5 respectively to decode the paging transmission that is multiplexed with the DRS transmission.

The POW, which is a set/number of POs within a paging cycle, could be configured to have the same length as the DTxW. The length can be configurable e.g. between 1-10 ms, and the eNB 12 may consider different factors such as the cell load and the corresponding LBT failure as well as the Transmit Opportunity (TXOP) to select an appropriate length for the POW. Unlike the DRS transmission, which may only be transmitted within certain System Frame Numbers (SFN), for which SFN mod 4=0, due to issues with the redundancy version, the POs within a POW do not have to fall into the same system frame, which gives more possibilities for paging configuration.

In embodiment 1, POWs are aligned with the DTxW of the serving cell. In this regard, POWs are used in MF instead of the Ns={1, 2, 4} POs described above and used in LTE. Same as for legacy LTE, the PF can be derived from the UE_ID. If the DTxW periodicity is 40 ms and occurs in SFN mod 4=0, the same will be valid for any PF. With a paging cycle of e.g. 320 ms, the UEs 14 are distributed between (320 ms/40 ms)=8 possible PF occurrences.

If a specific UE 14 needs to be paged, the eNB 12 will calculate the PF for the UE 14. Within that PF, the eNB 12 will multiplex the paging message with the DRS. To receive the paging, the UE 14 will thus expect CRS scrambling corresponding either to SF #0 or SF #5, depending on the subframe number in which the paging and DRS are transmitted. In an embodiment, the POW always starts at subframe #0.

In embodiment 1b, the paging is optionally allowed to be transmitted in another subframe, not containing the DRS, within the POW. To receive the paging, the UE 14 should thus expect the CRS scrambling to follow the actual subframe number, if not transmitted in the same subframe as the DRS.

In embodiment 1b, one UE could be paged in the DRS subframe, while another UE could be paged in another subframe succeeding the DRS subframe. As a consequence, the UE 14 does not necessarily stop monitoring paging transmission upon detection of DRS and paging transmission, where the paging message was intended for another UE. One possible option would be to configure the UE 14 to start the POW in the DRS subframe (extended paging occasion window), such that the POW may end after the DTxW.

In embodiment 2, POWs are configured independent of the serving cell's DTxW. In this regard, if the number of UEs 14 in a cell exceeds a certain threshold, the eNB 12 may decide to configure more POWs in order to distribute the UEs 14 in the time domain for the paging.

In an embodiment, the PFs are such that they may occur in any radio frame, such that e.g. SFN mod 4 can be 0, 1, 2, or 3. In another embodiment, the occurrence of the POW can be within a PF, i.e. a POW could have a length of 5 subframes and thus, there could be two POWs within a PF. The first POW could cover subframes #0-4, and the other POW could cover subframes #5-9. The distribution within a PF can be different depending on the length of the POW. Furthermore, the POWs could be configured with a subframe offset to expand over one or more radio frames. Then the formulae could be based e.g. on groups of 8 rather than 10 subframes. This would deviate from the existing formulae for LTE. It is important that the UE can derive its subframe group based on the SFN. If there are for example 1024 SFNs, and thus, 10240 subframes fit into 1024 SFNs. For simple calculations, 10240 should be divisible by the Paging Subframe Grouping (PSG), which can in some scenarios consist of 2, 4, 5, or 8 subframes. A PSG consisting of 5 subframes would allow for 2 POWs within a radio frame, which would correspond to a configuration of Ns=2 in a legacy system.

The Paging Subframe Grouping Number (PSGN) may be calculated as follows:

$$PSGN \bmod T_{MF} = (T_{MF} \text{ div } N_{MF})*(UE\_ID \bmod N_{MF})$$

$$T \rightarrow T_{MF} = T*(10/PSG)$$

$$N \rightarrow N_{MF} = N*(10/PSG)$$

At the end, the actual SFN+subframe offset will be derived from the PSGN:

$$SFN = PSGN*PSG \text{ div } 10$$

$$SFN \text{ subframe offset} = PSGN*PSG \bmod 10$$

A POW can be configured to be equal or smaller than the PSG. Having a shorter PSG allows more occasions to distribute the UEs and corresponds to a cell with many (idle mode) UEs, while a longer PSG would be needed to cope with cells with high traffic loads suffering from many LBT failures.

Configuring short POWs allows for lower battery consumption, but higher probability that the paging transmission has to be postponed to the next POW due to LBT failure.

Figure 2:
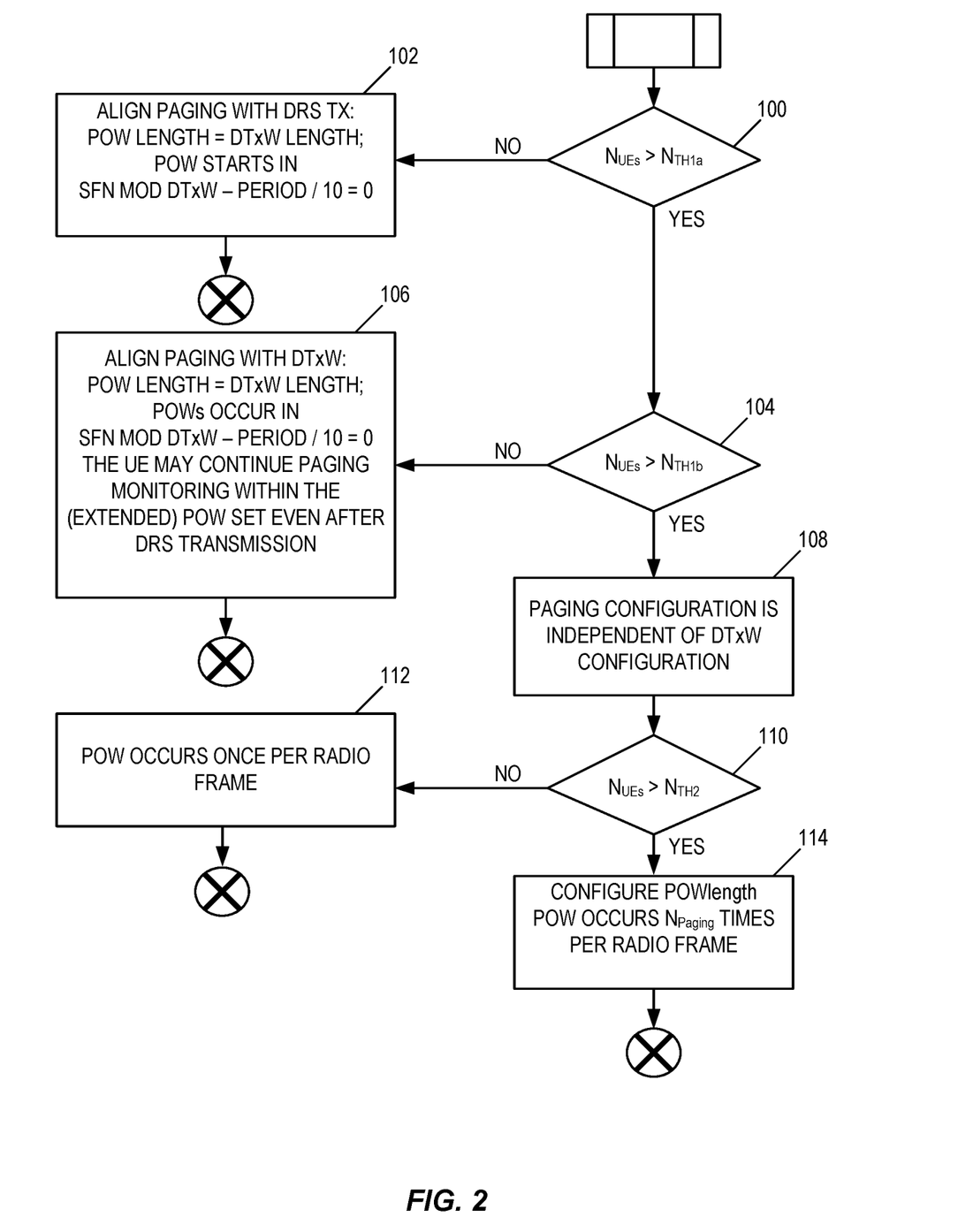
FIG. 2 illustrates a method of operating a network node.

FIG. 2 illustrates one example method of operation of the wireless network 10 of FIG. 1 according to some embodiments of the present disclosure. In this example, the network node 12 determines whether to utilize embodiment 1a, 1b, or 2 depending on the number of UEs. As illustrated, the network node 12 (e.g., the eNB 12) determines whether the number of UEs ($N_{UEs}$) is greater than a first threshold ($N_{TH1a}$) (step 100). If not, the network node 12 aligns paging with DRS transmission where the length of the POW is equal to the length of the DTxW and the POW starts in SFN mod DTxW-Period/10=0, as described above with respect to embodiment 1a (step 102). However, if the number of UEs 14 is greater than the first threshold, the network node 12 determines whether the number of UEs ($N_{UEs}$) is greater than a second threshold ($N_{TH1b}$) (step 104). If not, the network node 12 aligns paging with the DTxW where the POW length is equal to the DTxW and the POWs occur in SFN mod DTxW-Period/10=0, as described above with respect to embodiment 1b (step 106). The UE 14 may continue paging monitoring within an extended POW set even after DRS transmission. However, if the number of UEs ($N_{UEs}$) is greater than the second threshold ($N_{TH1b}$), the network node 12 configures paging independent of the DTxW (step 108). This allows paging to be more frequent than the DTxW-period. The network node 12 can configure the POW such that it occurs N times per DTxW. For example, if the DTxW-period is 160 ms, the network nodes 12 could configure the POW to occur e.g. every 4th radio frame (every 40 ms, N=4). If N=16, the POW would occur every radio frame. If N=32, the POW would occur $N_{Paging}$=2 times per radio frame. The network node 12 determines whether the number of UEs ($N_{UEs}$) is greater than a third threshold ($N_{TH2}$) (step 110). If not, the network node 14 configures the POW to occur once per radio frame (step 112). If the number of UEs ($N_{UEs}$) is greater than the third threshold ($N_{TH2}$), the network node 12 configures the POW length such that a POW occurs $N_{Paging}$ times per radio frame, where $N_{Paging}$ can be greater than 1 (step 114). The first, second, and third threshold may be predefined or preconfigured.

Figure 3:
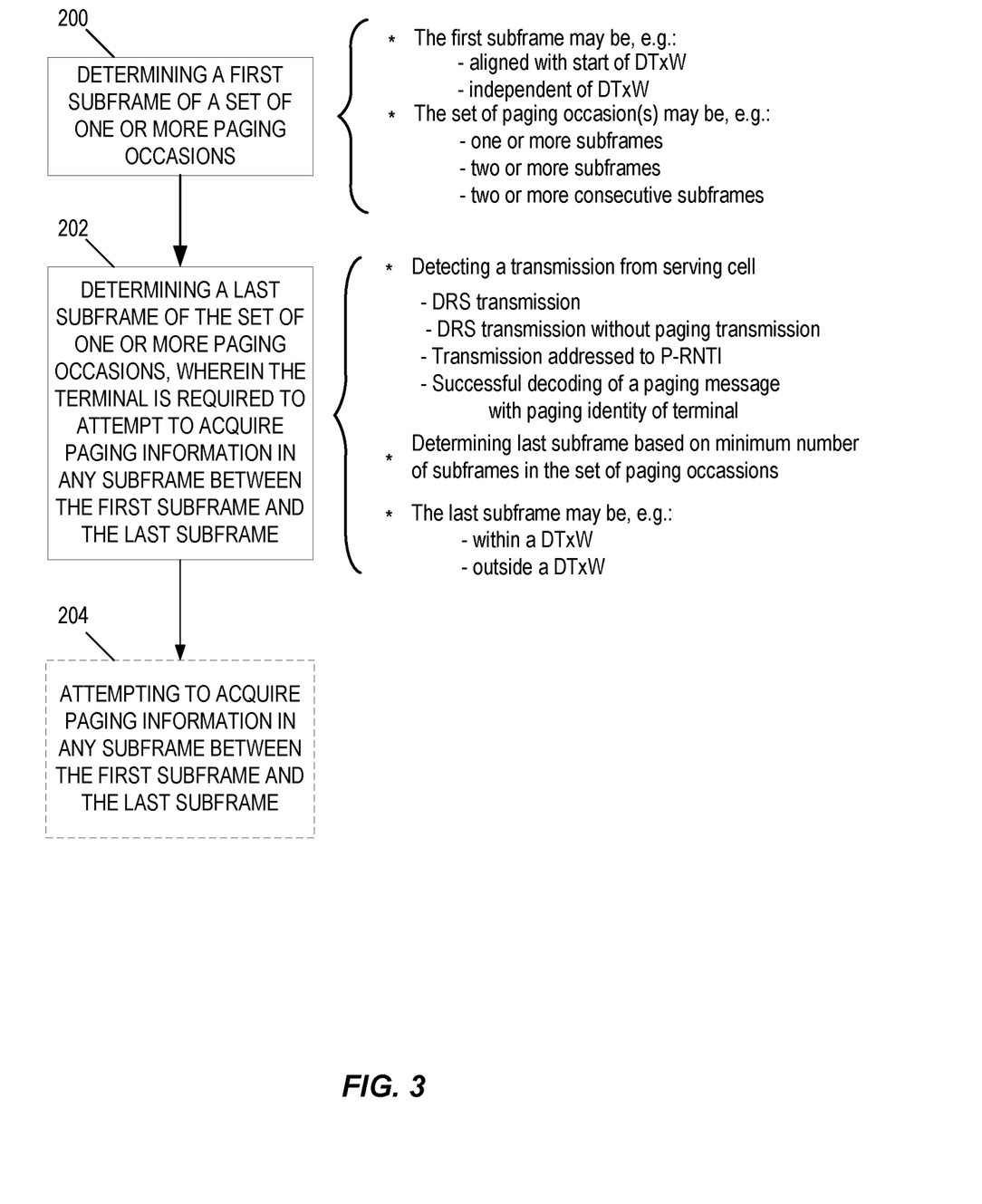
FIG. 3 illustrates a method of operating a user equipment to attempt for paging reception in a Listen-Before-Talk (LBT) network.

FIG. 3 illustrates a method in a terminal (e.g., the UE 14) for acquiring paging information during a set of one or more POs, one PO corresponding to a subframe, according to some embodiments of the present disclosure. The terminal determines a first subframe of a set of one or more POs (i.e., a PO set) (step 200). As described above, the first subframe of the set of one or more POs may be aligned with the start of the DTxW or be independent of the DTxW, depending on the particular embodiment. Further, the set of one or more POs may, depending on the embodiment, be, e.g., one or more subframes, two or more subframes, or two or more consecutive subframes.

The terminal determines a last subframe of the set of one or more POs, wherein the terminal is required to attempt to acquire paging information in any subframe between the first subframe and the last subframe (step 202). As discussed above, the last subframe may be within a DTxW or outside the DTxW, depending on the embodiment. The determining may be based on a minimum number of subframes in the set of POs.

Determining the last subframe includes detecting a transmission from the terminal's serving cell (e.g., an eNB or other network node). The transmission can be a DRS transmission. For example, the paging may be multiplexed with the DRS. The transmission can be a transmission addressed to Paging Radio Network Temporary Identifier (P-RNTI). Detecting the transmission can be successfully decoding a paging message with the paging identity of the terminal.

In some other embodiments, determining the last subframe includes determining the last subframe based on a minimum number of subframes in the set of POs.

In an optional step 204, the terminal attempts to acquire paging information in any subframe between the first subframe and the last subframe.

Figure 4:
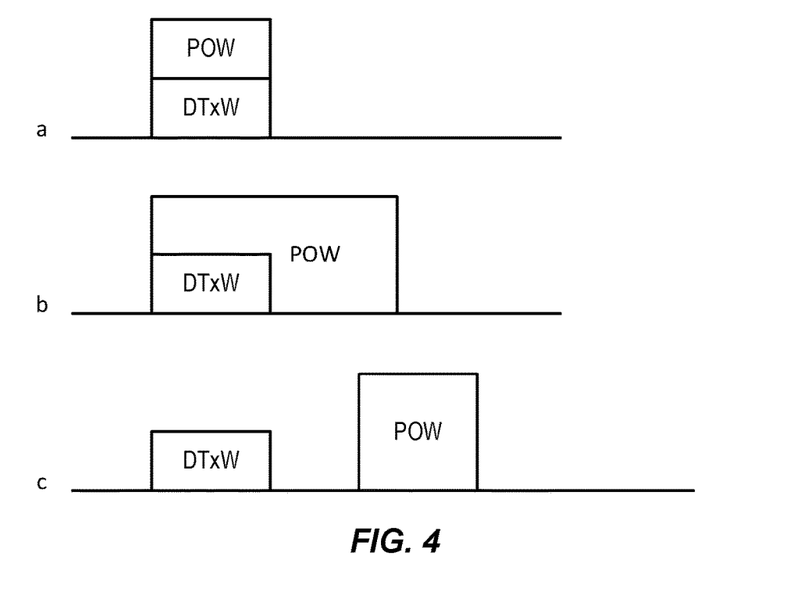
FIG. 4 illustrates exemplary relationships between a Discovery Reference Signal (DRS) Transmission Window (DTxW) and a Paging Occasion Window (POW).

FIG. 4 illustrates various configurations of a POW as described herein. In (a) of FIG. 4, one example of an embodiment in which the POW is aligned with the DTxW is illustrated. In (b) of FIG. 4, one example of an embodiment in which the start of the POW is aligned with the start of the DTxW and the POW extends beyond the end of the DTxW is illustrated. In (c) of FIG. 4, one example of an embodiment in which the POW is independent of the DTxW is illustrated.

Figure 5:
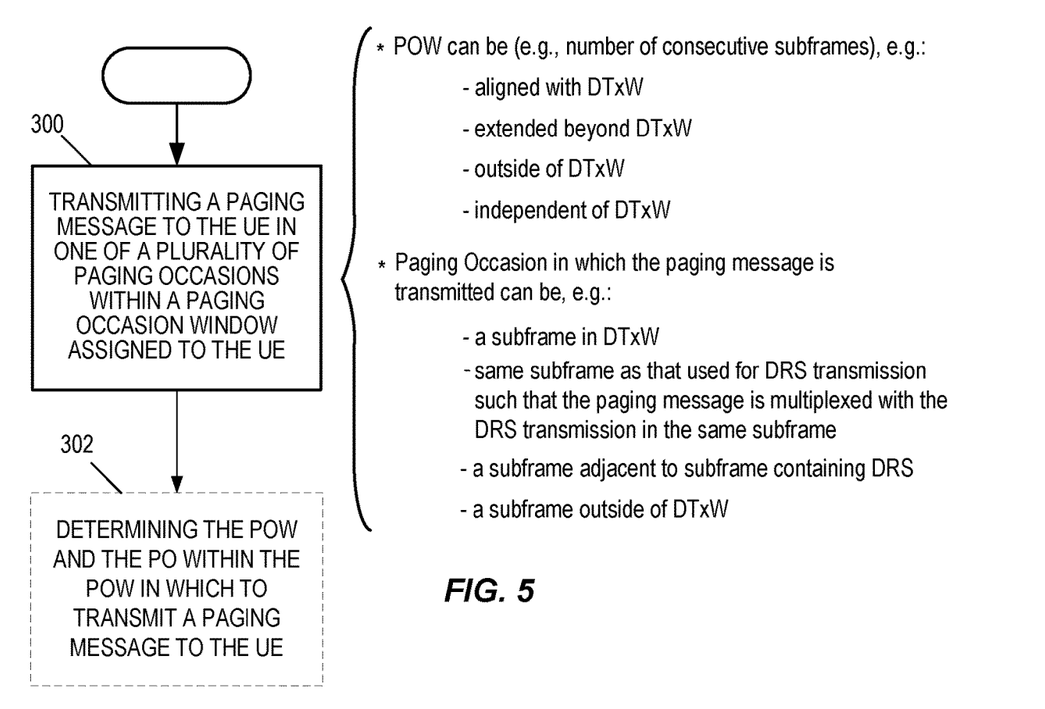
FIG. 5 illustrates a method of transmitting a paging message in a LBT network.

FIG. 5 illustrates a method of operation of the network node 12 (e.g., the eNB 12) according to some embodiments of the present disclosure. As illustrated, the network node 12 transmits a paging message to the UE 14 in one of a plurality of POs within a POW configured for the UE 14 (step 300). Prior to transmitting, the network node 12 needs to determine the POW and the PO location for the UE 14 (step 302). The POW can be a number of consecutive subframes that are, e.g., aligned with the DTxW, extended beyond the DTxW, or outside of and potentially independent from the DTxW. The PO in which the paging message is transmitted to the UE 14 can be, e.g., a subframe in the DTxW, the same subframe in which the DRS is transmitted such that the paging message is multiplexed with the DRX in the same subframe, a subframe adjacent to the subframe containing DRS, or a subframe that is outside of the DTxW.

Figure 6:
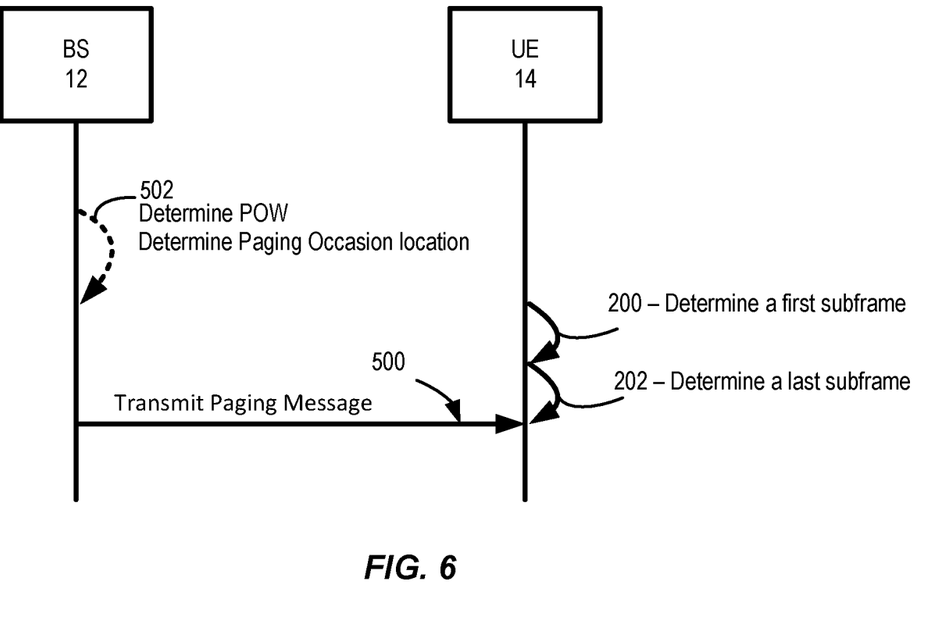
FIG. 6 illustrates message flow when transmitting a paging message in a LBT network.

FIG. 6 illustrates the operation of the network node 12 (e.g., the base station 12) and the UE 14 according to some embodiments described above. As illustrated, the base station 12 optionally determines the POW and the PO within the POW in which to transmit a paging message to the UE 14 (step 400), as described above. Subject to LBT, the base station 12 transmits a paging message to the UE 14 in the determined PO within the POW (step 402). At the UE 14, the UE 14 determines the first and last subframes in the set of subframes, or POs, that the UE 14 is to monitor for the paging message, as described above (steps 404 and 406).

Figure 7:
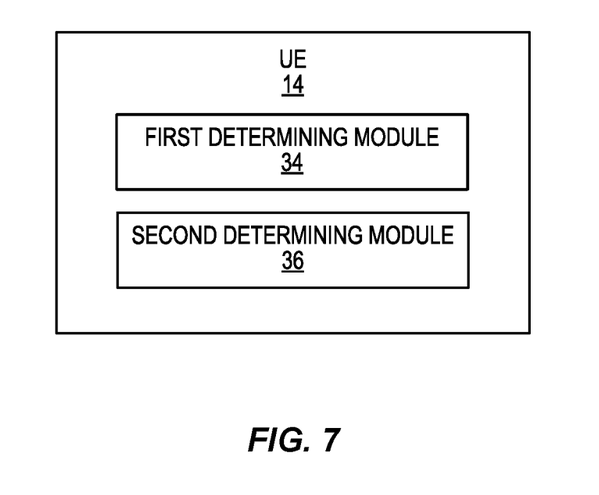
FIG. 7 illustrates a User Equipment (UE).

FIG. 7 illustrates a schematic block diagram of the UE 14 according to some embodiments of the UE 14. As illustrated, the UE 14 includes a first determining module 34 and a second determining module 36, each of which is implemented in software. The first determining module 34 is configured to determine the first subframe of a set of one or more POs. The second determining module 36 is configured to determine a last subframe of the set of one or more POs, wherein the UE 14 is required to attempt to acquire paging information in any subframe between the first subframe and the last subframe, as described above.

Figure 8:
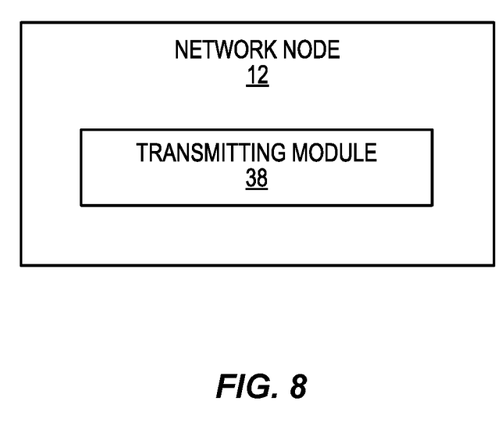
FIG. 8 illustrates a network node.

FIG. 8 illustrates a schematic block diagram of the network node 12 according to some embodiments of the network node 12. As illustrated, the network node 12 includes a transmitting module 38, which is implemented in software. The transmitting module 38 is configured to transmit a paging message to the UE 14 in one of a plurality of POs within a POW assigned to the UE 14, as described above. The transmitting module 38 may determine the POW and the PO location within the POW, as described above.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the figures. For example, the storage 22 may comprise computer readable means on which a computer program can be stored. The computer program may include instructions which cause the processor 20 (and any operatively coupled entities and devices, such as the interface 18 and the storage 22) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processors 20 and/or 26, possibly in cooperation with the storage 22 and/or 28. The processors 20 and/or 26 and the storage 22 and/or 28 may thus be arranged to allow the processors 20 and/or 26 to fetch instructions from the storage 22 and/or 28 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Some example embodiments are as follows:

Embodiment A: A method in a terminal for acquiring paging information during a set of one or more POs, one PO corresponding to a subframe, wherein the method comprises
  determining of a first subframe of said PO set;
  determining of a last subframe of said PO set, and
  wherein the terminal is required to attempt to acquire said paging information in any subframe between said first subframe and said last subframe of the PO.

Embodiment B: A method according to embodiment A wherein said determining of said last subframe of a PO set comprises that the UE detects a transmission from its serving cell Embodiment C: A method according to embodiment B wherein said detected transmission is a DRS transmission.

Embodiment D: A method according to embodiment B wherein said detected transmission is a transmission addressed to P-RNTI.

Embodiment E: A method according to embodiment B wherein said detected transmission comprises successfully decoding a paging message.

Embodiment F: A method according to embodiment E wherein said paging message contains the paging identity of said terminal.

Embodiment G: A method according to any of the embodiments above wherein determining of said last subframe of a PO set comprises determining a minimum number of subframes between said first and said last subframe.

Embodiment H: A method according to any of the embodiments above wherein said first subframe of a PO set is the first subframe of a DTxW.

Embodiment I: A network node comprising a wireless interface and a processor coupled to the interface and configured to perform any of the steps of the methods above.

Embodiment J: A wireless device comprising a wireless interface and a processor coupled to the interface and configured to perform any of the steps of the methods above.

Embodiment K: A network node comprising a processor and computer readable storage media, the storage media containing instructions executable by the processor, whereby the network node is operative to perform any the steps of the methods above.

Embodiment L: A wireless device comprising a processor and computer readable storage media, the storage media containing instructions executable by the processor, whereby the wireless device is operative to perform any the steps of the methods above.

Embodiment M: A network node comprising a plurality of modules, the modules configured to perform any the steps of the methods above.

Embodiment N: A wireless device comprising a plurality of modules, the modules configured to perform any the steps of the methods above.

The following acronyms are used throughout this disclosure.

3GPP Third Generation Partnership Project
ASIC Application Specific Integrated Circuit
BSC Base Station Controller
BTS Base Transceiver Station
CPU Central Processing Unit
CRS Cell-Specific Reference Signal
DRS Discovery Reference Signal
DRX Discontinuous Reception
DTxW DRS Transmission Window
eNB Enhanced or Evolved Node B
FDD Frequency Division Duplexing
FPGA Field Programmable Gate Array
IEEE Institute of Electrical and Electronics Engineers
IMSI International Mobile Subscriber Identity
IP Internet Protocol
LAA Licensed Assisted Access
LAN Local Area Network
LBT Listen Before Talk
LTE Long Term Evolution
MF MulteFire/MuLTEfire, an LTE-based technology for use in unlicensed spectrum
PCell Primary Cell
PDA Personal Digital Assistant
PDCCH Physical Downlink Control Channel
PDSCH Physical Downlink Shared Channel
PF Paging Frame
PO Paging Occasion POW Paging Occasion Window
P-RNTI Paging Radio Network Temporary Identifier
PSG Paging Subframe Grouping
PSGN Paging Subframe Grouping Number
PSTN Public Switched Telephone Network
RAM Random Access Memory
RAT Radio Access Technology
RNC Radio Network Controller
ROM Read-Only Memory
SCell Secondary Cell
SF Subframe
SFN System Frame Number
SIB System Information Block
TDD Time Division Duplexing
TXOP Transmit Opportunity
UE User Equipment
UL/DL Uplink/Downlink
USIM Universal Subscriber Identity Module
VoIP Voice-Over Internet Protocol
WAN Wide Area Network
WD Wireless Device
WLAN Wireless Local Area Network Those skilled in the art will recognize improvements and modifications to the embodiments of the present disclosure. All such improvements and modifications are considered within the scope of the concepts disclosed herein.

What is claimed is:

1. A method in a terminal for acquiring paging information during a set of one or more paging occasions, one paging occasion corresponding to a subframe, wherein the method comprises:
    determining a first subframe of the set of one or more paging occasions, wherein the first subframe of the set of one or more paging occasions is a subframe of a Discovery Reference Signal, DRS, Transmission Window, DTxW; and
    determining a last subframe of the set of one or more paging occasions,
        wherein the last subframe of the set of one or more paging occasions is a subframe outside of the DTxW, and
        wherein the terminal is required to attempt to acquire the paging information in any subframe between the first subframe and the last subframe of the set of one or more paging occasions.

2. The method according to claim 1, wherein the set of one or more paging occasions comprises a set of two or more paging occasions.

3. The method according to claim 1, wherein determining the last subframe of the set of one or more paging occasions comprises detecting a subframe having a Discovery Reference Signal, DRS, transmission, wherein a paging transmission is multiplexed with the DRS transmission in the same subframe.

4. The method according to claim 1, wherein determining the last subframe of the set of one or more paging occasions comprises detecting a transmission from a serving cell of the terminal.

5. The method according to claim 4, wherein the detected transmission is a DRS transmission and wherein the DRS transmission is multiplexed with a paging transmission within a subframe corresponding to the last subframe in the set of one or more paging occasions.

6. The method according to claim 4, wherein detecting the transmission from the serving cell of the terminal comprises successfully decoding a paging message.

7. The method according to claim 6, wherein the paging message contains a paging identity of the terminal.

8. The method according to claim 1, wherein determining the last subframe comprises detecting a transmission from the serving cell of the terminal having a Discovery Reference Signal, DRS, transmission without a paging transmission.

9. The method according to claim 1, wherein determining the last subframe of the set of one or more paging occasions comprises determining a minimum number of subframes between the first subframe and the last subframe.

10. The method according to claim 1, wherein the first subframe of the set of one or more paging occasions is a first subframe of the DRS transmission window, DTxW.

11. The method according to claim 1, wherein the first subframe of the set of one or more paging occasions is a first subframe of the DRS Transmission Window, DTxW, and the last subframe of the set of one or more paging occasions is another subframe of the DTxW.

12. The method according to claim 1, wherein the first subframe of the set of one or more paging occasions is a first subframe of the DRS Transmission Window, DTxW, and the last subframe of the set of one or more paging occasions is a last subframe of the DTxW.

13. The method according to claim 1, wherein the set of one or more paging occasions is outside of the DRS Transmission Window, DTxW.

14. The method according to claim 1, wherein the set of one or more paging occasions comprises a set of at least two consecutive subframes.

15. The method according to claim 1, wherein the terminal is required to attempt to acquire the paging information in any subframe between the first subframe and the last subframe of the set of one or more paging occasions in a channel that requires listen-before-talk, LBT.

16. The method according to claim 1, wherein the first subframe of the set of one or more paging occasions is subframe zero.

17. A terminal for acquiring paging information during a set of one or more paging occasions, one paging occasion corresponding to a subframe, wherein the terminal comprises:
    a wireless interface; and
    a processor coupled to the interface, and configured to:
        determine a first subframe of the set of one or more paging occasions, wherein the first subframe of the set of one or more paging occasions is a subframe of a Discovery Reference Signal, DRS, Transmission Window, DTxW; and
        determine a last subframe of the set of one or more paging occasions,
            wherein the last subframe of the set of one or more paging occasions is a subframe outside of the DTxW, and
            wherein the terminal is required to attempt to acquire the paging information in any subframe between the first subframe and the last subframe of the set of one or more paging occasions.

18. A method in a network node for paging a terminal within a paging occasion window assigned to the terminal, the paging occasion window comprising two or more paging occasions, one paging occasion corresponding to a subframe, wherein the method comprises:
    transmitting a paging message to the terminal in one of the two or more paging occasions within the paging occasion window assigned to the terminal, wherein a first subframe of the paging occasion window is aligned with a first subframe of a Discovery Reference Signal, DRS, Transmission Window, DTxW, of the network node and a last subframe of the paging occasion is after a last subframe of the DTxW such that the paging occasion window extends beyond the DTxW, and the one of the two or more paging occasions in which the paging message is transmitted is a subframe within the paging occasion window but outside of the DTxW.

19. The method of claim 18, wherein the one of the two or more paging occasions is a subframe within the DRS Transmission Window, DTxW.

20. The method of claim 19, wherein the paging message is multiplexed with a DRS transmission within the same subframe.

21. The method of claim 19, wherein the paging message is in a subframe adjacent to a subframe containing a DRS transmission.

22. The method of claim 19, wherein the paging occasion window is aligned with the DTxW.

23. The method of claim 18, wherein the paging occasion window is outside of the DRS Transmission Window, DTxW, in which the network node transmits a DRS.

24. The method of claim 18, wherein the one of the two or more paging occasions in which the paging message is transmitted is outside of the DRS Transmission Window, DTxW in which the network node transmits a DRS.

25. The method of claim 18, wherein the paging occasion window is independent of the DRS Transmission Window, DTxW.

26. The method of claim 18, wherein the two or more paging occasions in the paging occasion window comprises two or more consecutive subframes.

27. A network node, comprising:
a wireless interface; and
a processor coupled to the interface,
wherein the network node is configured to:
transmit a paging message to a terminal in one of two or more paging occasions within a paging occasion window assigned to the terminal,
wherein a first subframe of the paging occasion window is aligned with a first subframe of a Discovery Reference Signal, DRS, Transmission Window, DTxW, of the network node and a last subframe of the paging occasion is after a last subframe of the DTxW such that the paging occasion window extends beyond the DTxW, and the one of the two or more paging occasions in which the paging message is transmitted is a subframe within the paging occasion window but outside of the DTxW.

* * * * *